(12) United States Patent
Bishop (10) Patent No.: US 8,165,582 B2
(45) Date of Patent: Apr. 24, 2012

(54) REDUCING OCCURRENCE OF USER EQUIPMENT REGISTRATION EXPIRY DURING CALLS

(75) Inventor: Craig Bishop, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 343 days.

(21) Appl. No.: 12/433,712

(22) Filed: Apr. 30, 2009

(65) Prior Publication Data

US 2009/0276532 A1    Nov. 5, 2009

(30) Foreign Application Priority Data

May 2, 2008    (GB) .................................. 0808060.8

(51) Int. Cl.
*H04W 4/00*    (2009.01)

(52) U.S. Cl. .................. 455/435.1; 455/422; 455/435.2; 455/411; 709/228

(58) Field of Classification Search .................. None
See application file for complete search history.

(56) References Cited

U.S. PATENT DOCUMENTS

| | | | | |
|---|---|---|---|---|
| 5,442,634 | A | * | 8/1995 | Cizek ............................ 370/329 |
| 6,236,214 | B1 | * | 5/2001 | Camp et al. .................... 324/427 |
| 6,385,448 | B1 | | 5/2002 | Beckman et al. |

(Continued)

FOREIGN PATENT DOCUMENTS

WO    97/22214 A1    6/1997

(Continued)

OTHER PUBLICATIONS

Digital cellular telecommunication systems (Phase 2+), Universal Mobile Telecommunications System (UMTS), Internet Protocol (IP) multimedia call control protocol based on Session Initiation Protocol (SIP) and Session Description Protocol (SDP), Mar. 1, 2005, vol. 3-CNI, No. V5.12.0, ETSI Standards, Lis, Sophia Antipolis Cedex, France.

*Primary Examiner* — Jinsong Hu
*Assistant Examiner* — Benjamin Morales Fernandez
(74) *Attorney, Agent, or Firm* — Jefferson IP Law, LLP (57) ABSTRACT

Methods, systems, User Equipment (UE), and computer readable medium for reducing the occurrence of UE registration expiry are provided. A method of reducing the occurrence of UE registration expiry during calls includes registering a UE with a network for a registration period, determining a re-registration threshold time period, comparing a duration of a remaining portion of the registration period at a particular time with the re-registration threshold time period, and attempting to re-register the UE with the network for a further registration period if the remaining portion is less than or equal to the re-registration threshold time period, wherein the determining of the re-registration threshold time period includes at least one of setting the threshold time period to a value greater than 600 seconds, determining the threshold time period according to a remaining talk time of the UE at the particular time, determining the threshold time period according to a state of the UE at the particular time, determining the threshold time period according to a duration of at least one previous call made by the UE, determining the threshold time period according to a statistical parameter of a plurality of calls made by the UE, determining the threshold time period according to a statistical parameter of a plurality of calls made by at least one UE, determining the threshold time period according to a predefined maximum call duration, and determining the threshold time period independently of a length of the registration period.

20 Claims, 6 Drawing Sheets

U.S. PATENT DOCUMENTS

| | | | |
|---|---|---|---|
| 2007/0298794 A1* | 12/2007 | Cho | 455/435.1 |
| 2009/0305700 A1* | 12/2009 | Levy | 455/435.1 |

FOREIGN PATENT DOCUMENTS

| | | | |
|---|---|---|---|
| WO | 03/055265 A1 | 7/2003 |
| WO | 03/084257 A1 | 10/2003 |
| WO | WO 2007113427 A1 * | 10/2007 |
| WO | 2008/016320 A1 | 2/2008 |

* cited by examiner

REDUCING OCCURRENCE OF USER EQUIPMENT REGISTRATION EXPIRY DURING CALLS

PRIORITY

This application claims the benefit under 35 U.S.C. §119 (a) of a United Kingdom patent application filed on May 2, 2008 in the United Kingdom Intellectual Property Office and assigned Serial No. GB0808060.8, the entire disclosure of which is hereby incorporated by reference.

BACKGROUND OF THE INVENTION

1. Field of the Invention

The present invention relates to User Equipment (UE) and communications systems in which the UE registers with a network. More particularly, the present invention is concerned with the problem of UE registration with an Internet Protocol (IP) Multimedia Subsystem (IMS) network expiring during an IMS call or other session utilizing Circuit Switched (CS) bearers for the transport of the media, when re-registration is not possible.

2. Background to the Invention

The following abbreviations will be used throughout this disclosure:
   AS Application Server
   CS Circuit Switched
   DTM Dual Transfer Mode
   E-UTRAN Enhanced-Universal Mobile Telecommunications System (UMTS) Terrestrial Radio Access Network (UTRAN) (aka Long Term Evolution (LTE))
   GERAN Global System for Mobile communications (GSM) Enhanced Radio Access Network
   ICS Internet Protocol (IP) Multimedia Subsystem (IMS) Centralized Services
   IMS IP Multimedia Subsystem
   MGW Media GateWay
   MO Mobile Originated
   MSC Mobile Switching Centre
   MT Mobile Terminated
   OMA DM Open Mobile Alliance Device Management
   PS Packet Switched
   SC Service Continuity
   SCC Service Centralization and Continuity
   S-CSCF Serving-Call Session Control Function
   UE User Equipment Internet Protocol (IP) Multimedia Subsystem (IMS) networks are well known. They have an architecture, and use protocols, which deliver IP multimedia to mobile users (that is, to the user's mobile User Equipment (UE)). One part of the interaction between UE and an IMS network is that the UE registers with the network. More particularly, the UE registers a public user identity with the network, and this registration is for a registration period.

Currently, when an IMS Centralized Services (ICS)/Service Continuity (SC) UE (i.e. an IMS compatible UE) moves from one Access Network to another, there is the possibility that the UE's IMS registration will expire if the media is being carried via a Circuit Switched (CS) bearer, and the transferred-in Access Network does not support simultaneous Packet Switched (PS) and CS bearers, e.g. Global System for Mobile communications (GSM) Enhanced Radio Access Network GERAN not having Dual Transfer Mode (DTM). This is because a PS bearer is necessary to carry the IMS re-registration request. However, if the ongoing session (call) is utilizing a CS bearer, simultaneous use of a PS bearer is not possible.

This problem also occurs when the UE is in Idle Mode in a network that does not support simultaneous PS and CS and is IMS registered. In that case, subsequent call establishment using ICS I1 procedures will result in an ICS session that relies on the UE's IMS registration. If the registration subsequently expires, the remote leg established via the IMS will be released.

The conventional default expiration time requested by the UE for IMS registration (i.e. the default registration period when the UE registers with the IMS network) is specified in $3^{rd}$ Generation Partnership Project (3GPP) Technical Specification 24.229 (3GPP TS 24.229) as 600,000 seconds. The entire contents of 3GPP TS24.229 is hereby incorporated by reference. This default period may be reduced by the Registrar in the network (Serving-Call Session Control Function (S-CSCF)) depending on operator policy in the 200 OK message that is sent in response to the REGISTER message from the UE. The UE may re-register at any time following the reception of the 200 OK message, but the default behavior described in 3GPP TS 24.229 is that the UE should re-register in IMS, 600 seconds before expiry of the registration if the expiry time (i.e. initial registration period) was greater than 1200 seconds, or when half the registration time (registration period) has expired if the registration period was less than 1200 seconds. Thus, 3GPP TS 24.229 specifies that re-registration should take place at a time determined by (i.e. dependent upon) the length of the initial registration period. However, this threshold for re-registration of 600 s or less before the expiry time may not be sufficient for a UE engaged in an ICS call, as it is possible that the call may exist in a non simultaneous PS and CS capable Access Network (when the UE cannot contact the IMS to re-register), for longer than 600 seconds.

SUMMARY OF THE INVENTION

An aspect of the present invention is to address at least the above-mentioned problems and/or disadvantages and to provide at least the advantages described below. Accordingly, an aspect of the present invention is to provide a method of reducing the occurrence (or at least the probability of the occurrence) of User Equipment (UE) Internet Protocol (IP) Multimedia Subsystem (IMS) registration expiry during calls (e.g. IMS sessions/calls) from the UE (and in particular, although not exclusively, during sessions or calls utilizing Circuit Switched (CS) bearers for the transport of the media).

In accordance with an aspect of the present invention, a method for reducing the occurrence of UE IMS registration expiry is the provided. The method includes registering a UE with an IMS network for a registration period, determining a re-registration threshold time period, comparing a duration of a remaining portion of the registration period at a particular time with the re-registration threshold time period, and attempting to re-register the UE with the IMS network for a further registration period if said remaining portion is less than or equal to said re-registration threshold time period, wherein the determining of said re-registration threshold time period includes at least one of setting said threshold time period to a value greater than 600 seconds, determining said threshold time period according to a remaining talk time of the UE at said particular time, determining said threshold time period according to a state (condition etc.) of the UE at said particular time, determining said threshold time period according to a duration of at least one previous call made by the UE, determining said threshold time period according to a statistical parameter of a plurality of calls made by the UE, determining said threshold time period according to a statistical parameter of a plurality of calls made by at least one UE (e.g. one or more UE previously and/or currently registered with the IMS network), determining said threshold time period according to a predefined maximum call duration (e.g. a typical maximum call duration, based on knowledge of user behavior and/or analysis of previous calls), and determining said threshold time period independently of a length of the registration period.

The setting of the threshold time period according to a remaining talk time may include setting the threshold according to an estimated remaining talk time, based for example on the current battery level (i.e. remaining charge) or other potentially relevant factor likely to limit the length of a call.

The determining of the threshold time period according to a state or condition of the UE may for example take into account a battery level or other state variable associated with the user equipment.

The determining of the threshold time period according to a duration of at least one previous call made by the UE may, for example, correspond to setting the threshold time period equal to an integer multiple or some other multiple of a previous call duration (such as the longest call made by the UE in a particular time period). Alternatively, the threshold time period may be set according to a statistical parameter of a plurality of calls made by the UE or indeed by the UE and/or other user equipment. Thus, the threshold time period may be set to correspond to an integer multiple or other multiple of a typical or average call duration, or indeed an integer multiple or other multiple of a typical or average maximum call duration from user equipment. It will be appreciated, however, that these are merely examples, and the threshold time period may be set in accordance with other statistical parameters to suit requirements.

It will also be appreciated that the UE may perform its own statistical analysis of its previous calls in order to determine the threshold time period. Additionally, or alternatively, the network may perform statistical analysis of calls from the UE and/or other UE in order to determine the threshold time period to be used.

Advantageously, in this method embodying an exemplary embodiment of the present invention, the re-registration threshold time period may be set to a longer duration than has previously been proposed in order to reduce the probability of IMS registration expiring during an IMS session in which communication with the UE utilizes a CS bearer, precluding re-registration using a PS bearer.

In certain exemplary embodiments, the method further includes re-registering the UE with the IMS network for the further registration period.

In certain exemplary embodiments, the method further includes determining the further registration period.

In certain exemplary embodiments, the method further includes using the IMS network to determine the further registration period, and communicating the further registration period to the UE.

In certain exemplary embodiments, the determining of the further registration period includes determining the further registration period according to an activity status of the UE.

For example, in the determining of the further registration period, the network and/or the UE may take into account the fact that the UE is currently involved in a call or other IMS session and the current duration of that session.

Thus, it will be appreciated that when the UE attempts to re-register, the further registration period it is allocated by the network is not necessarily the same as the initial registration period, may be the same or different, and may be determined in accordance with system parameters or session statistics.

In certain exemplary embodiments, the determining of said re-registration threshold time period includes determining said re-registration threshold time period with (i.e. using) the UE.

In certain exemplary embodiments, the determining of said re-registration threshold time period includes determining said re-registration threshold time period with (i.e. using) the IMS network.

In certain exemplary embodiments, the method further comprises communicating the re-registration threshold time period from the network to the UE.

In certain exemplary embodiments, the UE is battery powered and the method includes determining the re-registration threshold time period according to UE battery charge status at the particular time.

In certain exemplary embodiments, the determining of said re-registration threshold time period includes setting the re-registration threshold time period to twice an average call duration, determined from an analysis of at least two previous calls.

According to another aspect of the present invention, a communication system is provided. The communication system includes an IMS network and UE for communicating with the IMS network, for registering with the IMS network for a registration period, for comparing a duration of a remaining portion of the registration period at a particular time with the re-registration threshold time period, and for attempting to re-register with the IMS network for a further registration period if said remaining portion is less than or equal to said re-registration threshold time period, wherein at least one of the UE and the IMS network determines said re-registration threshold time period, and further wherein said re-registration threshold time period is at least one of set to a value greater than 600 seconds, determined independently of a length of a registration period, and determined according to one or more of, a remaining talk time of the UE at said particular time, a state (condition etc.) of the UE at said particular time, a duration of at least one previous call made by the UE, a statistical parameter of a plurality of calls made by the UE, a statistical parameter of a plurality of calls made by at least one UE (e.g. one or more UE previously and/or currently registered with the IMS network), and a predefined maximum call duration (e.g. a typical maximum call duration, based on knowledge of user behavior and/or analysis of previous calls).

In certain exemplary embodiments, the IMS network is adapted to determine the re-registration threshold time period, and to communicate (e.g. send) the re-registration threshold time period to the UE.

In certain exemplary embodiments, the UE is adapted to determine the re-registration threshold time period.

In certain exemplary embodiments, the IMS network is adapted to determine the further registration period, and to communicate the further registration period to the UE.

In certain exemplary embodiments, the network is adapted to determine the further registration period according to an activity status of the UE.

In certain exemplary embodiments, the UE is battery powered and the UE or network is adapted to determine the re-registration threshold time period according to UE battery charge status at the particular time.

According to another aspect of the present invention, a UE for a communication system as described above is provided.

According to yet another aspect of the present invention, UE adapted to communicate with an IMS network is provided. The UE is adapted to register with the IMS network for a registration period, determine a re-registration threshold time period, compare a duration of a remaining portion of the registration period at a particular time with the re-registration threshold time period, and to attempt to re-register with the IMS network for a further registration period if said remaining portion is less than or equal to said re-registration threshold time period, wherein said re-registration threshold time period is at least one of set to a value greater than 600 seconds, determined independently of a length of a registration period, and determined according to one or more of a remaining talk time of the UE at said particular time, a state (condition etc.) of the UE at said particular time, a duration of at least one previous call made by the UE, a statistical parameter of a plurality of calls made by the UE, a statistical parameter of a plurality of calls made by at least one UE (e.g. one or more UE previously and/or currently registered with the IMS network), and a predefined maximum call duration (e.g. a typical maximum call duration, based on knowledge of user behavior and/or analysis of previous calls).

According to another aspect of the present invention, UE for communicating with an IMS network is provided. The UE is adapted to register with the IMS network for a registration period, receive a re-registration threshold time period from the IMS network, compare a duration of a remaining portion of the registration period at a particular time with the re-registration threshold time period, and attempt to re-register with the IMS network for a further registration period if said remaining portion is less than or equal to said re-registration threshold time period.

Although the above aspects are concerned with the registration and re-registration of UE with/in IMS networks, the present invention is not limited to such applications, and may also be employed in systems in which UE registers with a network for a registration period, and in which expiry of the registration period during an ongoing call or other communication session between the UE and network would be problematic.

According to still another aspect of the present invention, a method of reducing the occurrence of UE registration expiry during calls from the UE is provided. The method includes registering a UE with a network for a registration period, determining a re-registration threshold time period, comparing a duration of a remaining portion of the registration period at a particular time with the re-registration threshold time period, and attempting to re-register the UE with the network for a further registration period if said remaining portion is less than or equal to said re-registration threshold time period, wherein the determining of said re-registration threshold time period comprises at least one of setting said threshold time period to a value greater than 600 seconds, determining said threshold time period according to a remaining talk time of the UE at said particular time, determining said threshold time period according to a state of the UE at said particular time, determining said threshold time period according to a duration of at least one previous call made by the UE, determining said threshold time period according to a statistical parameter of a plurality of calls made by the UE, determining said threshold time period according to a statistical parameter of a plurality of calls made by at least one UE, determining said threshold time period according to a predefined maximum call duration, and determining said threshold time period independently of a length of the registration period.

According to additional aspects of the present invention, a communication system comprising a network and UE adapted to carry out a method described above, and user equipment for such a communication system are provided.

According to another aspect of the present invention, a computer readable medium for storing a computer program of instructions configured to be readable by at least one processor to execute a computer process for performing a method described above is provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

As will be appreciated from the above, certain exemplary embodiments of the present invention are concerned with the problem of Internet Protocol (IP) Multimedia Subsystem (IMS) registration expiration avoidance during Session Continuity. Thus, an area to which certain exemplary embodiments of the present invention apply is 3$^{rd}$ Generation Partnership Project (3GPP) Service Centralization and Continuity (SCC).

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In certain exemplary embodiments, the need for User Equipment (UE) to re-register (or attempt to re-register) during an IMS session (a call, or other session) is avoided by means of the UE determining its remaining registration time while engaged in a call and re-registering if the remaining registration timer falls below a given threshold.

It is believed that there has been no previous solution to the problem of unwanted IMS registration expiry during a session. For example, a note was added to 3GPP Technical Specification 23.292 (3GPP TS 23.292) in SA2 #64, reading:

"Editor's note: Currently, when UE's IMS Registration expires, the ongoing session if exists may be cleared as specified in 3GPP TS 23.228. It is FFS how to keep the remote leg when the Registration expires."

Thus, there has been no proposal to reduce the occurrence (or probability of occurrence) of IMS registration expiry. In contrast, the proposal was to accept such an event, and then to work on how to maintain the "remote leg" when expiry had already occurred.

The following specifications are relevant to the exemplary embodiments of the present invention, and the entire contents of each is hereby incorporated by reference:

3GPP TS 23.292 IMS Centralized Services (ICS), Stage 2
3GPP TS 23.237 IMS Service Continuity (SC), Stage 2
3GPP TS 24.229 IP multimedia call control protocol based on Session Initiation Protocol (SIP) and Session Description Protocol (SDP), Stage 3

3GPP TS 23.292 and 3GPP TS 23.237 standards specify means of offering continuity of services provided by the IMS as a UE moves between Access Networks that may or may not be capable of supporting real time media via a Packet Switched (PS) domain in which case a Circuit Switched (CS) domain is used to carry the media. Further, Access Network's may or may not be capable of supporting simultaneous PS and CS bearers allowing control of IMS Centralized Services (ICS) sessions or IMS signaling via PS when a using a CS bearer for the media.

When an ICS/SC UE performs Access Transfer from one Access Network to another, or handover within 3GPP between e.g. Enhanced-Universal Mobile Telecommunications System (UMTS) Terrestrial Radio Access Network (UTRAN) (E-UTRAN) and Global System for Mobile communications (GSM) Enhanced Radio Access Network (GE-RAN) there is the possibility that the UE's IMS registration will expire in an Access Network if the media is being carried over a CS bearer, and the transferred-in Access Network does not support simultaneous PS and CS bearers. E.g. GERAN not having Dual Transfer Mode (DTM). This is because a PS bearer is needed to carry the IMS re-registration.

The problem may also occur when the UE is IMS registered and in Idle Mode in a network that does not support simultaneous PS and CS. In that case, subsequent call establishment using ICS I1 procedures will result in an ICS session that relies on the UE's IMS registration. However, if the registration subsequently expires, the remote leg from the Service Centralization and Continuity Application Server that is established via the IMS, will be released.

In certain exemplary embodiments of the present invention, rather than specifying how to avoid the loss of the remote leg on IMS registration expiration when the UE is engaged in an ICS session and is not able to re-register in IMS via a PS bearer, the UE may avoid IMS registration expiration by checking its remaining registration time while engaged in a call via IMS or in Idle Mode (with PS bearers available), and re-registering if the remaining registration timer falls below a threshold.

As described above, the current default expiration time requested by the UE for IMS registration, as specified in 3GPP TS 24.229 is 600,000 seconds. This may be reduced by the Registrar in the network (Serving-Call Session Control Function (S-CSCF)) depending on operator policy in the 200 OK message that is sent in response to the REGISTER message from the UE. The UE may re-register at any time following the reception of the 200 OK message, but the default behavior described in the 3GPP TS 24.229 is that the UE should re-register in IMS, 600 seconds before expiry of the registration if the expiry time was greater than 1200 seconds, or when half the registration time has expired if the registration expiry was less than 1200 seconds. As also mentioned above, this threshold is probably not sufficient for a UE engaged in an ICS call as it is possible that the call may exist in a non simultaneous PS and CS capable Access Network (when the UE cannot contact the IMS to re-register), for much longer than 600 seconds.

Therefore, in certain exemplary embodiments of the present invention, the ICS UE re-registers at a time when the remaining registration time is at least as great as its remaining talk time. The remaining talk-time may be infinite if the UE is mains powered, but generally the maximum talk-time of a battery powered UE should be greater than all but a very small number of calls and this should mean that calls dropped due to IMS registration expiry should be below the "noise level" of calls dropped for other reasons.

In certain exemplary embodiments, the threshold (re-registration threshold time period) is hard coded in the UE by the manufacturer at the time of manufacturer.

In alternative exemplary embodiments, the re-registration threshold time period is signaled (to the UE) by the home IMS as part of the operator policy provisioned via Open Mobile Alliance Device Management (OMA DM).

For this to work, the IMS registration expiry time granted by the ICS supporting home IMS network should also be set at a level that should ensure IMS registration is unlikely to expire when the UE has an active IMS session via a non-simultaneous PS and CS supporting Access Network, e.g. at twice the average talk-time of a UE. It could also be possible for the Registrar (S-CSCF) to recognize when the UE was engaged in an active session and grant a registration expiration time accordingly.

Figure 1:
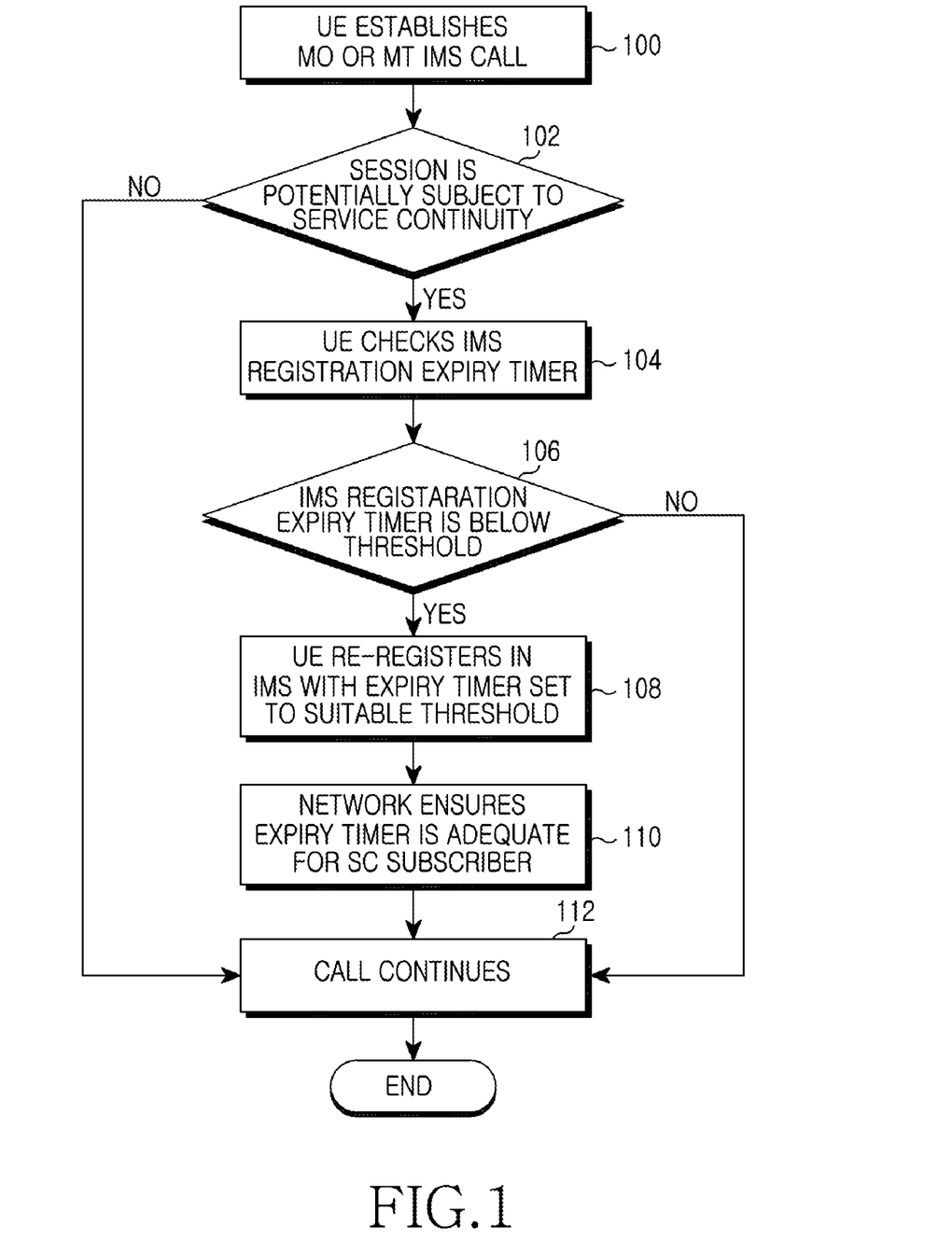
FIG. 1 is a flowchart illustrating a method when User Equipment (UE) is engaged in an Internet Protocol (IP) Multimedia Subsystem (IMS) session that may subsequently be transferred to an Access Network using a Circuit Switched (CS) bearer for media and does not support simultaneous Packet Switched (PS) and CS bearers, according to an exemplary embodiment of the present invention.
Figure 2:
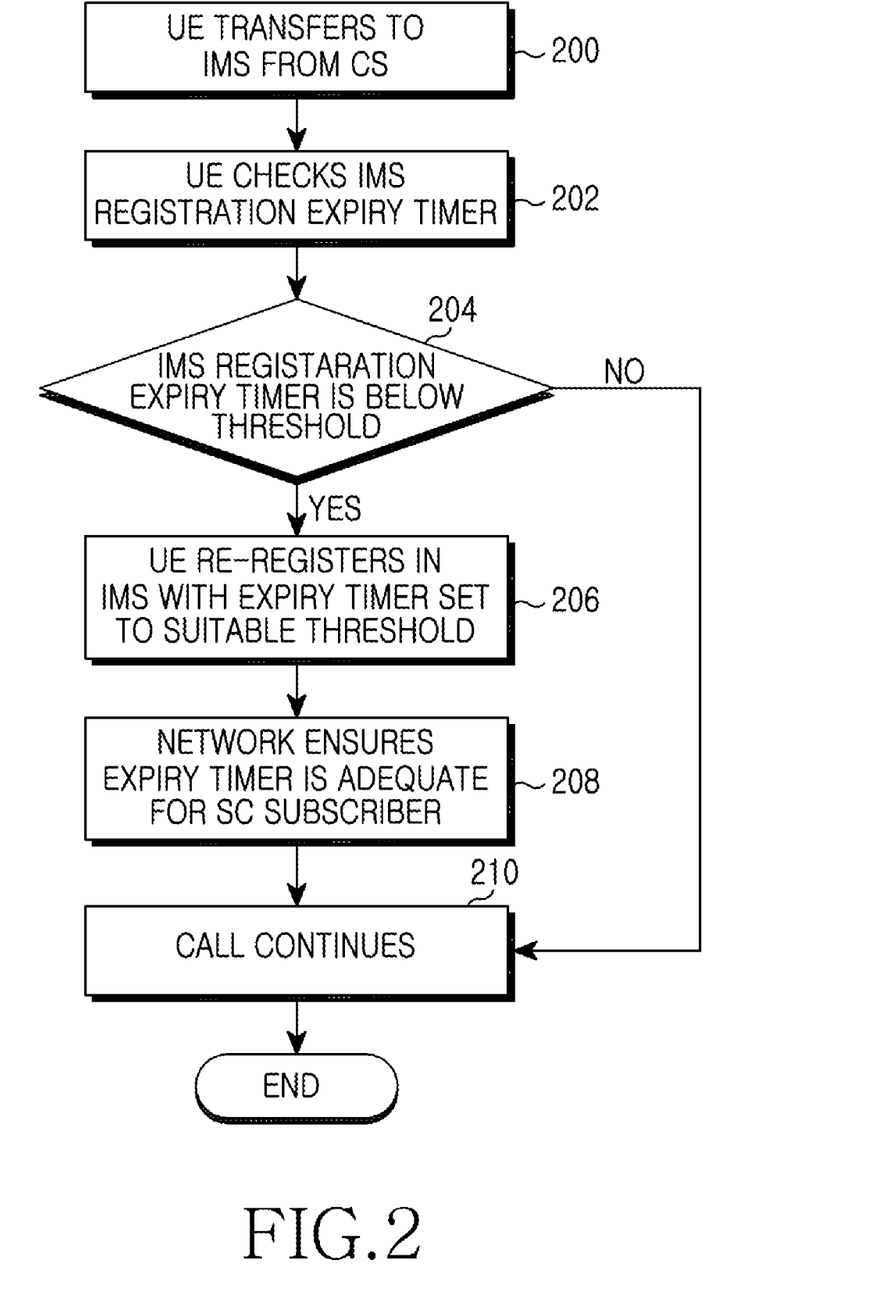
FIG. 2 is a flowchart illustrating a method when UE has transferred into an Access Network where a signaling connection to an IMS is available in parallel with real time media, according to an exemplary embodiment of the present invention.
Figure 3:
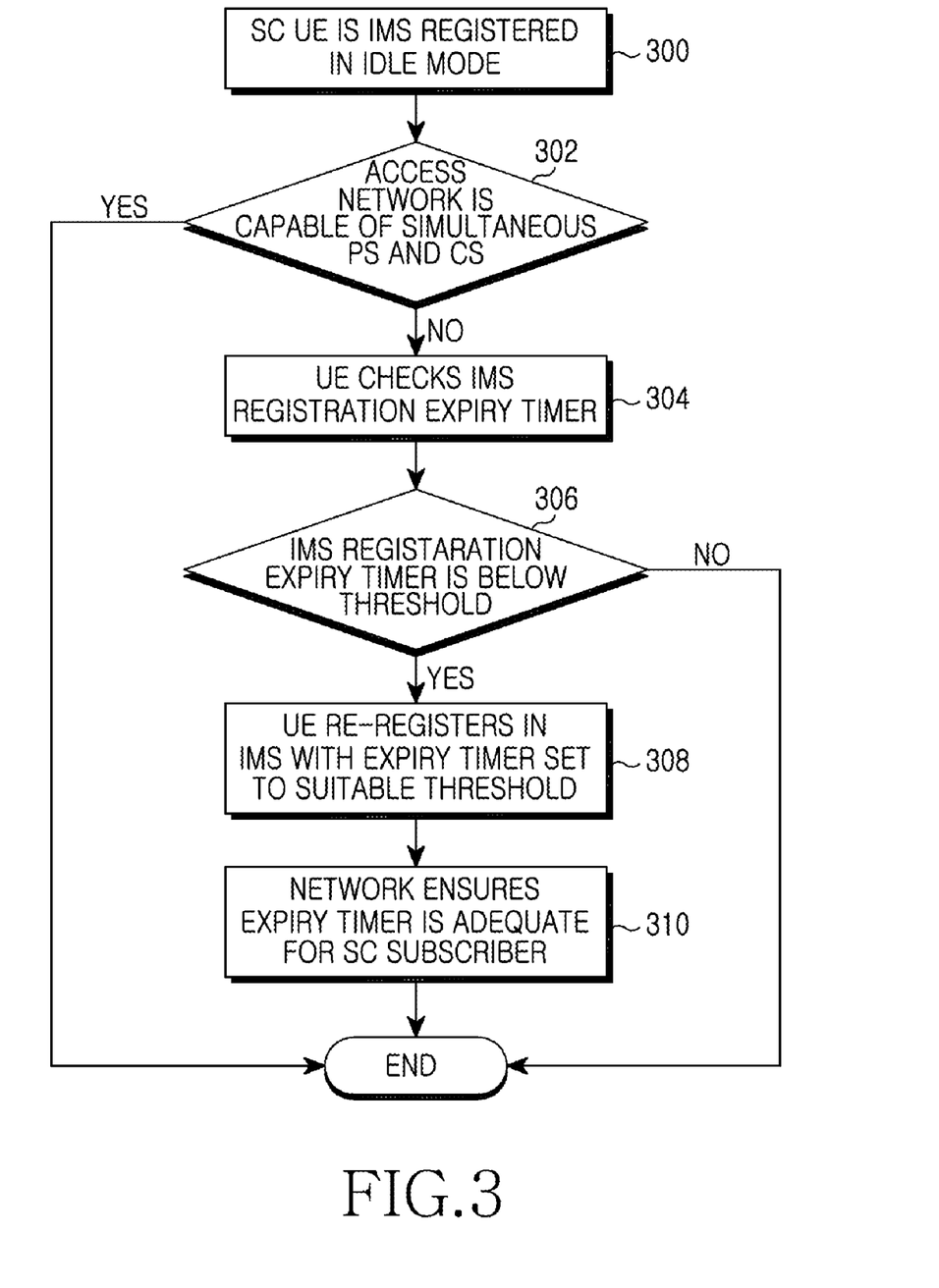
FIG. 3 is a flowchart illustrating a method in which UE is IMS registered in an Idle Mode in a network where any subsequent session will be established using a CS bearer for media and where simultaneous PS and CS bearers are not supported, according to an exemplary embodiment of the present invention.

FIGS. 1-3 are flowcharts illustrating methods according to exemplary embodiments of the present invention.

FIG. 1 illustrates a method when UE is engaged in an IMS session that may subsequently be transferred to an Access Network using a CS bearer for media and not supporting simultaneous PS and CS bearers according to exemplary embodiments of the present invention.

Referring to FIG. 1, in step 100 the UE establishes whether a call is a Mobile Originated (MO) or a Mobile Terminated (MT) IMS call. Next, the method determines whether the session is potentially going to be subject to SC in step 102. If it is, the UE checks the IMS registration expiry timer in step 104. Next, if the registration expiry timer is at or below the re-registration threshold in step 106, the UE then attempts to re-register in the IMS network with the expiry timer set to a suitable threshold in step 108. Next, the network ensures that the expiry timer is adequate for the SC subscriber in step 110, and then the call continues in step 112. If it is not determined that the session is potentially going to be subject to SC in step 102, or if the registration expiry timer is greater than the re-registration threshold in step 106, the call continues in step 112.

FIG. 2 illustrates a method when UE has transferred into an Access Network where a signaling connection to an IMS is available in parallel with real time media according to exemplary embodiments of the present invention.

Referring to FIG. 2, in step 200 the UE transfers to IMS from CS. Next, the UE checks the IMS registration expiry timer in step 202. In step 204, if the expiry timer is below the threshold, then the UE attempts to re-register in the IMS with the expiry timer set to a suitable threshold in step 206. Again, in step 208, the network then ensures that the expiry timer is adequate for the SC subscriber before the call continues in step 210. If the expiry timer is at or above the threshold in step 204, the call continues in step 210.

FIG. 3 illustrates a method in which UE is IMS registered in an Idle Mode in a network where any subsequent session will be established using a CS bearer for media and where simultaneous PS and CS bearers are not supported according to exemplary embodiments of the present invention.

Referring to FIG. 3, the method begins with a SC UE being IMS registered and in an idle mode in step 300. Then, it is determined whether the access network is capable of simultaneous PS and CS communication in step 302. If the access network is not capable of such simultaneous communication, the UE checks the IMS registration expiry timer to determine if the timer is below a threshold in step 304. If the timer is below the threshold in step 306, the UE attempts to re-register in the IMS with the expiry timer set to a suitable threshold in step 308. Finally, the network again ensures that the expiry timer is adequate for the SC subscriber in step 310 and the method ends thereafter. If the access network is capable of simultaneous communication in step 302, or if the timer is at or above the threshold in step 306, the method ends.

It will be appreciated that a UE will generally be aware when it is in a position to be able to re-register with an IMS network because of signals it receives from the network. However, when the UE is about to move from one access network to another, it will not in advance be aware when it is about to become involved in a session via a CS bearer that will preclude its ability to re-register because simultaneous communication via a PS bearer will not be possible. Exemplary embodiments of the present invention aim to reduce the chances of IMS registration expiry occurring during a session in which simultaneous and PS communication is not possible by having the UE repeatedly determine its remaining IMS registration time with a suitably set re-registration threshold time period. By making this threshold time period sufficiently long (taking into account typical call durations, or maximum call durations, for example) the UE can re-register in sufficient time so that even when it enters into a session during which re-registration is not possible, its registration is unlikely to expire during that session.

Figure 4:
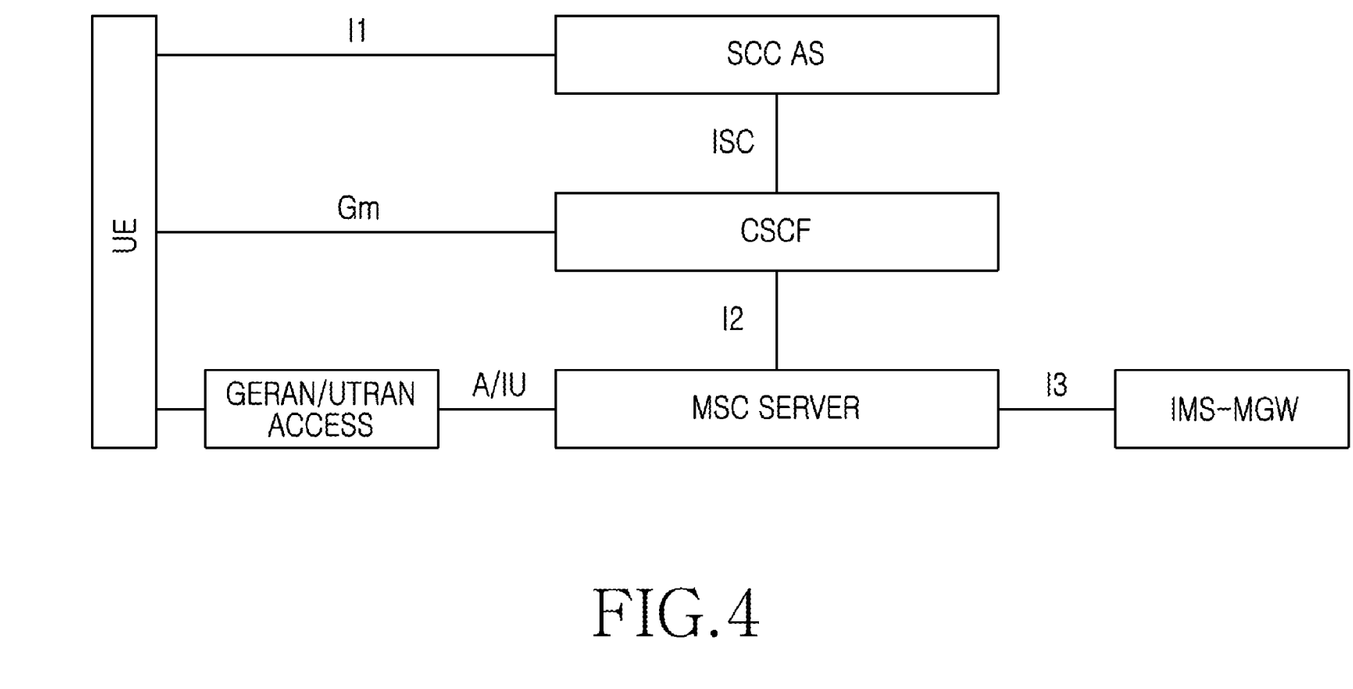
FIG. 4 is a block diagram illustrating an architecture for IMS Centralized Services (ICS) and Service Continuity (SC), according to an exemplary embodiment of the present invention.
Figure 5:
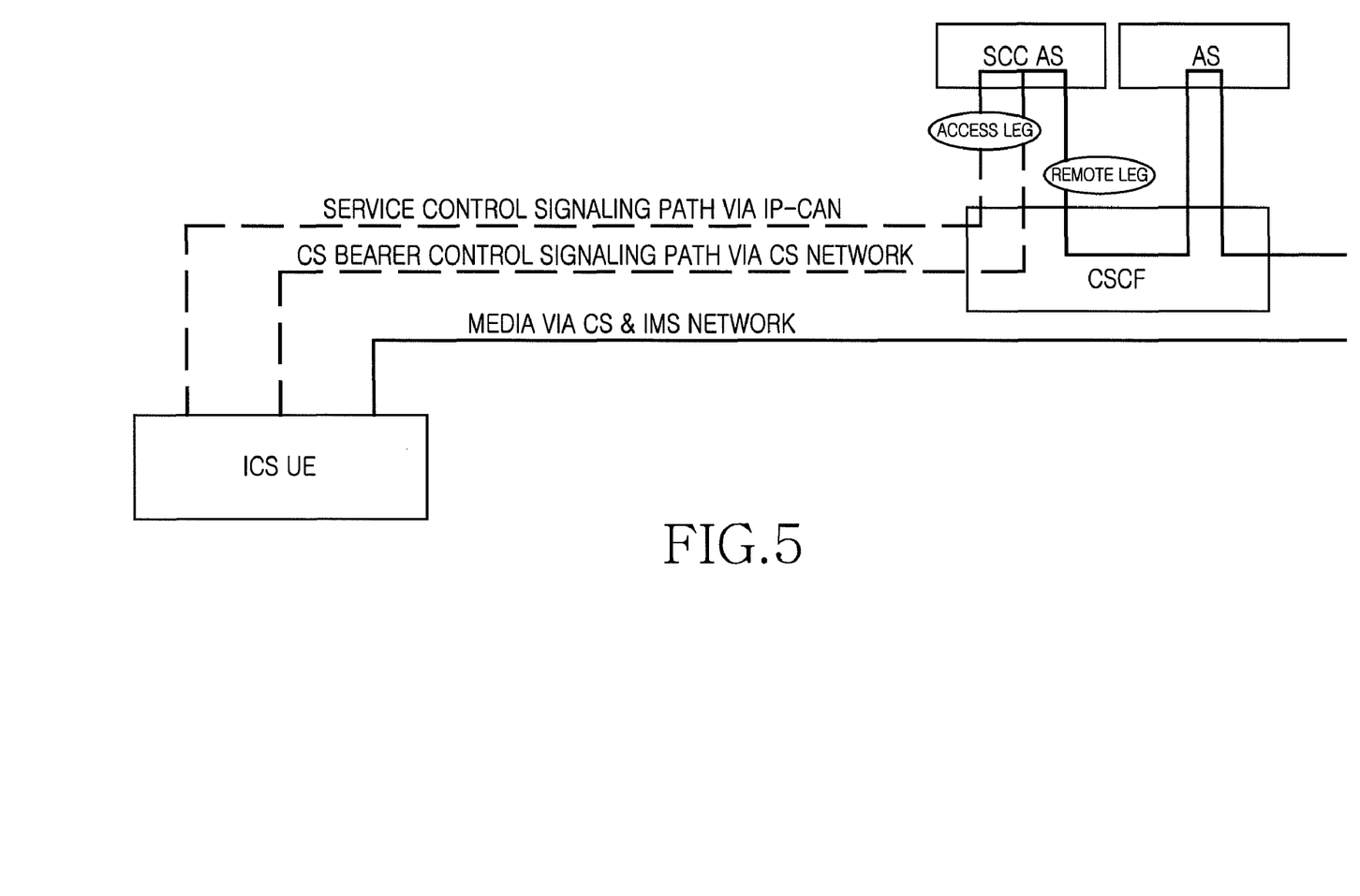
FIG. 5 is a block diagram illustrating ICS UE session signaling and a bearer path using a PS network for a service control signaling path, according to an exemplary embodiment of the present invention.
Figure 6:
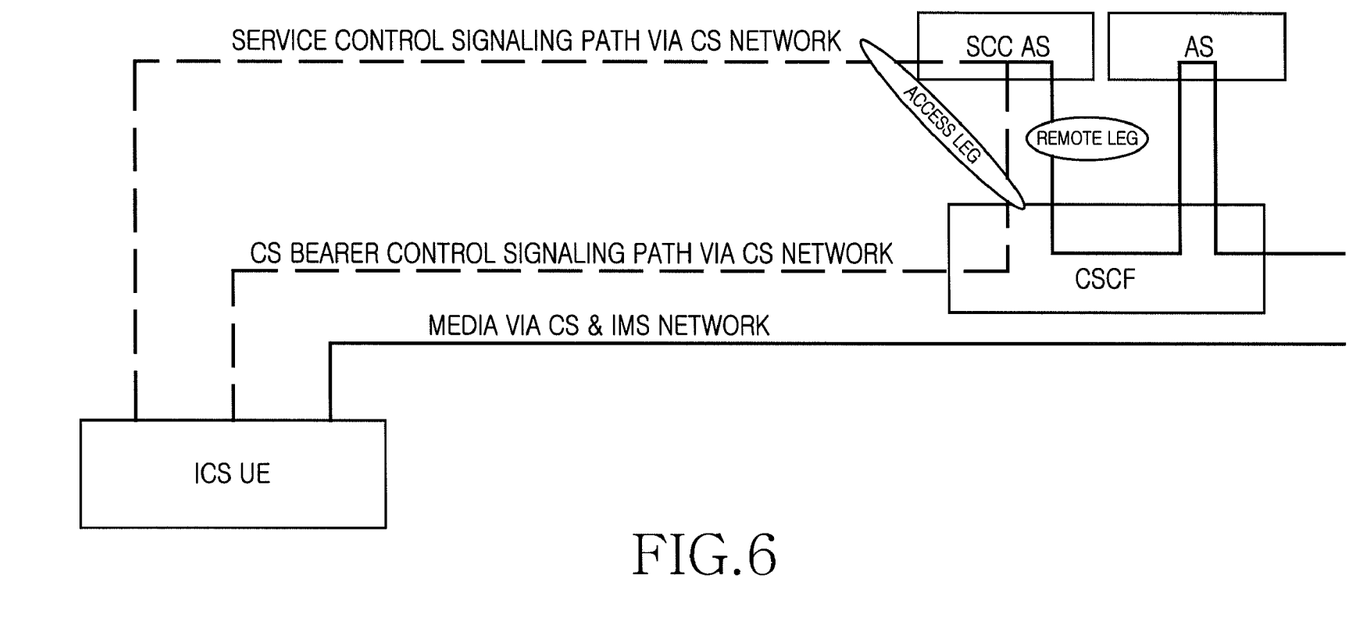
FIG. 6 is a block diagram illustrating ICS UE session signaling and a bearer path using a CS network for a service control signaling path, according to an exemplary embodiment of the present invention.

FIGS. 4 to 6 and the following description, some of which may be from 3GPP TS 23.292, provide background information that is useful for understanding exemplary embodiments of the present invention.

FIG. 4 is a block diagram illustrating an architecture for 3GPP ICS and SC according to an exemplary embodiment of the present invention.

Exemplary embodiments of the present invention are concerned with the UE enhanced to support ICS and its communication with the Service Centralization and Continuity Application Server (SCC AS) via GM and I1 reference points.

FIG. 5 is a block diagram illustrating ICS UE session signaling and a bearer path using a PS network for a service control signaling path according to an exemplary embodiment of the present invention.

Upon session initiation, the ICS UE or the SCC AS establishes the Service Control Signaling Path for communication of service control signaling via the PS network using the Gm reference point. The ICS UE also sets up the CS Bearer Control Signaling Path using conventional CS network procedures to establish the circuit media. The SCC AS combines the service control signaling received over the Service Control Signaling Path with the description of the bearer established using the CS Bearer Control Signaling Path by acting as a Back-to-back User Agent (B2BUA) as described below:

Access Leg: The Access Leg is formed with a combination of the Service Control Signaling Path and the CS Bearer Control Signaling Path.

Remote Leg: The Remote Leg is presented by the SCC AS to the CSCF as an IMS session using 3GPP SIP signaling on behalf of the UE.

FIG. 6 is a block diagram illustrating ICS UE session signaling and a bearer path using a CS network for a service control signaling path according to an exemplary embodiment of the present invention.

Upon session initiation, the ICS UE or the SCC AS establishes the Service Control Signaling Path for communication of service control signaling via the CS network using the I1 reference point. In parallel, the ICS UE or the SCC AS sets up the CS Bearer Control Signaling Path using standard CS network procedures to establish the circuit media. The SCC AS combines the Service Control Signaling Path with the bearer established using the CS Bearer Control Signaling Path by acting as a B2BUA as described above for the case of Service Control Signaling Path established via the PS network.

When the UE moves to an Access Network that does not support simultaneous PS and CS, it is no longer possible to send IMS messages via the GM reference point. This is the situation where the IMS registration may expire if the registration timer has not been set appropriately.

It will be appreciated that the issue of IMS de-registration of an ICS UE during an ongoing ICS session has previously been raised, and in the past it was agreed that it would be for future study as to how to keep the remote leg when the IMS registration expires.

This disclosure discusses IMS registration and the potential for it to expire during an ongoing ICS session while the UE is in an Access Network not supporting simultaneous PS and CS. Exemplary embodiments of the present invention address the issue, not of how to maintain the remote leg when the IMS registration expires, but of how to avoid that IMS registration expiration occurs while the UE is not in a position to re-register.

As discussed above, when an ICS/SC UE performs Access Transfer from one Access Network to another, or handover within 3GPP between e.g. E-UTRAN and GERAN there is a possibility that the UE's IMS registration will expire if the media is being carried over a CS bearer, and the Access Network does not support simultaneous PS and CS bearers. E.g. in GERAN not having DTM. This problem may also potentially occur following call establishment when the UE is IMS registered via a network that does not support simultaneous PS and CS. In that case, the call established using ICS I1 procedures still results in an ICS session that relies on the UE's IMS registration, and if registration subsequently expires (with the UE having no means to re-register), the remote leg should be release according to existing procedures in 3GPP TS 24.229.

3GPP TS 24.229 section 5.1.1.4.1 states that the default remaining IMS registration time at which point an IMS UE shall re-register in IMS (unless an UE application or the user has determined re-registration is not necessary) is 600 seconds. That means it would potentially be possible for a UE in an ICS session having signaling via Gm to transfer or handover to an Access Network not supporting simultaneous PS and CS with only 601 seconds remaining until IMS registration expiration. Similarly, a UE in an Idle Mode may enter an ICS session via an Access Network not supporting simultaneous PS and CS, with only 601 seconds of IMS registration remaining. This is not long enough to ensure that the call will have been release by either end or will have returned to an Access Network supporting signaling via Gm simultaneously for the bi-directional speech media, before IMS registration expires.

One possible solution would be to try to keep the remote leg when IMS registration expires. Such a solution would appear at the very least to require changes to the S-CSCF, such that it can recognize when a remote leg has been established by an Application Server on behalf of a UE and that it should be maintained even when the UE IMS registration expires. Generally, any solution requiring changes to existing IMS entities is not preferred.

Exemplary embodiments of the present invention provide a different solution. Rather than specifying how to avoid the loss of the remote leg on IMS registration expiration, it is possible for the UE/Network to avoid IMS registration expiration, by setting the registration expiry and re-registration threshold appropriately, e.g. by having a sufficiently long IMS registration expiration time and having the UE re-register if the remaining registration duration falls below a given threshold, that threshold being determined or set so that it is likely to exceed the length of any subsequent or remaining call.

3GPP TS 24.229 states that the UE can perform re-registration at any time after the initial registration has been completed. The default duration requested by the UE during registration is 600000 seconds, though this may be reduced by the S-CSCF. As stated above however, the default time at which the UE shall re-register is 600 seconds prior to registration expiration (if the registration period was for greater than 1200 s), or, if the registration duration is less than 1200 seconds, when half the registration duration has expired. For a UE that is battery powered, an appropriate time at which to re-register in many cases is a time at which the remaining registration period is equal to its remaining talk-time (as determined by its battery charge state or level), after which the call would have to be released in any case. For a mains powered UE, however, it may be appropriate to re-register when a longer time remains until registration expiration. For example, in certain exemplary embodiments, the re-registration threshold period is set to correspond to a maximum talk-time (determined, for example, by analysis of a number of previous calls made by the UE or indeed other UEs). Although this may still lead to IMS registration expiration during an ongoing ICS session, the length of the session by that time would be such that release of the call due to IMS registration expiration would potentially be lost in the "noise" of the call being dropped due to other reasons. The IMS re-registration time for ICS UE could be a matter of implementation in the UE, with a network that implements ICS setting an appropriate expiration duration, for example at least twice the average maximum UE talk-time, upon registration.

Alternatively, the re-registration time could be communicated by the network operator as part of provisioned operator policy and even be based on maximum call length statistics, if the operator wishes to exert more control.

Thus, in certain exemplary embodiments of the present invention, the network sets an appropriate IMS registration duration to ensure the UE IMS registration is unlikely to expire during an ongoing ICS session when the UE is unable to register via Gm. Furthermore, in order to avoid ICS session release due to IMS registration expiration, an ICS UE shall re-register in IMS in time to ensure that any subsequent ICS session will not be released due to IMS registration expiration.

In certain exemplary embodiments of the present invention, when the CS bearer is used for the media of the IMS session, the Gm reference point may be used for communication of service control signaling, contingent upon the Visited Public Land Mobile Network (VPLMN) support of the GM reference point. A change of access network due to handover, as described in 3GPP TS 23.009 and 3GPP TS 25.413, the entire disclosures of each of which are hereby incorporated by reference, may result in an inability to use the PS access for the GM reference point while the use of CS access for the media of the IMS session is still possible. Under such circumstance, the service continuity is maintained by switching the signaling transport over to the CS access, e.g. by switching the use of Gm with the I1 reference point or to not using Gm or I1.

With regard to the use of Gm reference point being possible after handover.

Standard handover procedures, such as those described in 3GPP TS 23.009 and 3GPP TS 25.413, are used for handover of the Service Control Signaling Path and the CS Bearer Control Signaling Path along with the associated circuit bearer to the target access network.

The use of a Gm reference point for a Service Control Signaling Path is maintained upon handover.

If the use of the Gm reference point is not possible after Handover.

Standard CS handover procedures, such as those as described in 3GPP TS 23.009 and 3GPP TS 25.413, are used to relocate the CS Bearer Control Signaling Path and the associated circuit bearer to the target access network. Upon completion of the handover of the CS Bearer Control Signaling Path and the associated circuit bearer to the target access, the UE sends a handover notification message to the SCC AS to indicate use of I1 for the Service Control Signaling Path if the I1 reference point is available in the target access network or to fallback to not using Gm or I1.

After handover, the I1 reference point is used for session control signaling in networks that support the I1 reference point. The non ICS UE procedures apply in networks that do not support the I1 reference point.

If the SCC AS detects that the ICS UE is not reachable by Gm, the SCC AS should clear all inactive sessions related to the user if any are present, and update the remote leg if necessary.

In order to avoid release of an ongoing session due to the UE's IMS Registration expiring when connecting via an Access Network not supporting simultaneous PS and CS, the ICS UE shall re-register its public user identity at a time at least equal to its remaining active mode time prior to the expiration of its present IMS registration time. Furthermore, the Registrar in a network implementing ICS should set the IMS registration expiry time to a value appropriate to ensure that re-registration by the ICS UE does not occur with a frequency resulting in an unacceptable signaling overhead, e.g. with a period less than that the average maximum active mode time of a UE.

It will be appreciated that exemplary embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing a system or method as claimed in any one of the claims of this specification and a machine-readable storage storing such a program. Still further, such programs may be conveyed electronically via any medium such as a communication signal carried over a wired or wireless connection and embodiments suitably encompass the same.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reducing the occurrence of User Equipment (UE) Internet Protocol (IP) Multimedia Subsystem (IMS) registration expiry, the method comprising:
   registering a UE with an IMS network for a registration period; determining a re-registration threshold time period;
   comparing a duration of a remaining portion of the registration period at a particular time with the re-registration threshold time period; and
   attempting to re-register the UE with the IMS network for a further registration period if said remaining portion is less than or equal to said re-registration threshold time period,
   wherein the determining of said re-registration threshold time period comprises at least one of:
   setting said threshold time period to a value greater than 600 seconds;
   determining said threshold time period according to a remaining talk time of the UE at said particular time;
   determining said threshold time period according to a state of the UE at said particular time;
   determining said threshold time period according to a duration of at least one previous call made by the UE;
   determining said threshold time period according to a statistical parameter of a plurality of calls made by the UE;
   determining said threshold time period according to a statistical parameter of a plurality of calls made by at least one UE;
   determining said threshold time period according to a predefined maximum call duration; and
   determining said threshold time period independently of a length of the registration period.

2. The method of claim 1, further comprising re-registering the UE with the IMS network for the further registration period.

3. The method of claim 2, further comprising determining the further registration period.

4. The method of claim 3, wherein the determining of the further registration period comprises:
   determining the further registration period using the IMS network; and
   communicating the further registration period to the UE.

5. The method of claim 3, wherein the determining of the further registration period comprises determining the further registration period according to an activity status of the UE.

6. The method of claim 1, wherein the determining of said re-registration threshold time period comprises determining said re-registration threshold time period using the UE.

7. The method of claim 1, wherein the determining of said re-registration threshold time period comprises determining said re-registration threshold time period using the IMS network.

8. The method of claim 7, further comprising
   communicating the re-registration threshold time period from the network to the UE.

9. The method of claim 1, wherein the UE is battery powered, and further wherein the determining of the re-registration threshold time period comprises determining the re-registration threshold time period according to UE battery charge status at the particular time.

10. The method of claim 1, wherein the determining of said re-registration threshold time period comprises setting the re-registration threshold time period to twice an average call duration determined from an analysis of at least two previous calls.

11. A communication system, the system comprising:
an Internet Protocol (IP) Multimedia Subsystem (IMS) network; and
User Equipment (UE) for communicating with the IMS network, for registering with the IMS network for a registration period, for comparing a duration of a remaining portion of the registration period at a particular time with a re-registration threshold time period, and for attempting to re-register with the IMS network for a further registration period if said remaining portion is less than or equal to said re-registration threshold time period,
wherein at least one of the UE and the IMS network determines said re-registration threshold time period, and
further wherein said re-registration threshold time period is at least one of set to a value greater than 600 seconds, determined independently of a length of a registration period, and determined according to one or more of: a remaining talk time of the UE at said particular time, a state of the UE at said particular time, a duration of at least one previous call made by the UE, a statistical parameter of a plurality of calls made by the UE, a statistical parameter of a plurality of calls made by at least one UE, and a predefined maximum call duration.

12. The system of claim 11, wherein the IMS network determines the re-registration threshold time period and communicates the re-registration threshold time period to the UE.

13. The system of claim 11, wherein the UE determines the re-registration threshold time period.

14. The system of claim 11, wherein the IMS network determines the further registration period and communicates the further registration period to the UE.

15. The system of claim 14, wherein the IMS network determines the further registration period according to an activity status of the UE.

16. The system of claim 11, wherein the UE is battery powered and one of the UE and the network determines the re-registration threshold time period according to UE battery charge status at the particular time.

17. User Equipment (UE) for communicating with an Internet Protocol (IP) Multimedia Subsystem (IMS) network, wherein the UE is adapted to:
register with the IMS network for a registration period;
determine a re-registration threshold time period;
compare a duration of a remaining portion of the registration period at a particular time with the re-registration threshold time period; and
attempt to re-register with the IMS network for a further registration period if said remaining portion is less than or equal to said re-registration threshold time period, and
wherein said re-registration threshold time period is at least one of set to a value greater than 600 seconds, determined independently of a length of a registration period, and determined according to one or more of:
a remaining talk time of the UE at said particular time, a state of the UE at said particular time, a duration of at least one previous call made by the UE, a statistical parameter of a plurality of calls made by the UE, a statistical parameter of a plurality of calls made by at least one UE, and a predefined maximum call duration.

18. The UE of claim 17, wherein the UE is informed of the re-registration threshold time period when the IMS network determines the re-registration threshold time period.

19. A method for reducing the occurrence of User Equipment (UE) registration expiry during calls from the UE, the method comprising:
registering a UE with a network for a registration period;
determining a re-registration threshold time period;
comparing a duration of a remaining portion of the registration period at a particular time with the re-registration threshold time period; and
attempting to re-register the UE with the network for a further registration period if said remaining portion is less than or equal to said re-registration threshold time period,
wherein the determining of said re-registration threshold time period comprises at least one of: setting said threshold time period to a value greater than 600 seconds;
determining said threshold time period according to a remaining talk time of the UE at said particular time;
determining said threshold time period according to a state of the UE at said particular time;
determining said threshold time period according to a duration of at least one previous call made by the UE;
determining said threshold time period according to a statistical parameter of a plurality of calls made by the UE;
determining said threshold time period according to a statistical parameter of a plurality of calls made by at least one UE;
determining said threshold time period according to a predefined maximum call duration; and
determining said threshold time period independently of a length of the registration period.

20. A non-transitory computer readable storage medium for storing a computer program of instructions configured to be readable by at least one processor to execute a computer process for performing the method as recited in claim 1.

* * * * *